(12) United States Patent
Asai et al.

(10) Patent No.: US 12,504,187 B2
(45) Date of Patent: Dec. 23, 2025

(54) SPACE PURIFICATION DEVICE

(71) Applicant: Panasonic Intellectual Property Management Co., Ltd., Kadoma (JP)

(72) Inventors: Fumiaki Asai, Aichi (JP); Mai Ishiguro, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 162 days.

(21) Appl. No.: 18/683,955

(22) PCT Filed: Jun. 29, 2022

(86) PCT No.: PCT/JP2022/025867
§ 371 (c)(1),
(2) Date: Feb. 15, 2024

(87) PCT Pub. No.: WO2023/021853
PCT Pub. Date: Feb. 23, 2023

(65) Prior Publication Data
US 2024/0344724 A1 Oct. 17, 2024

(30) Foreign Application Priority Data
Aug. 20, 2021 (JP) .................... 2021-134528

(51) Int. Cl.
| F24F 8/24 | (2021.01) |
| F24F 8/80 | (2021.01) |
| F24F 110/10 | (2018.01) |
| F24F 110/20 | (2018.01) |
| F24F 110/50 | (2018.01) |

(52) U.S. Cl.
CPC .................. *F24F 8/24* (2021.01); *F24F 8/80* (2021.01); *F24F 2110/10* (2018.01); *F24F 2110/20* (2018.01); *F24F 2110/50* (2018.01)

(58) Field of Classification Search
CPC ...... F24F 8/24; F24F 8/80; F24F 8/117; F24F 2110/10; F24F 2110/20; F24F 2110/50; F24F 11/74; F24F 11/70; A61L 9/01; C02F 1/461
See application file for complete search history.

(56) References Cited

FOREIGN PATENT DOCUMENTS

| JP | 2003170168 A | * | 6/2003 |
| JP | 2004066211 A | * | 3/2004 |
| JP | 2004089970 A | * | 3/2004 |
| JP | 2010-019430 A | | 1/2010 |
| JP | 5042476 B2 | * | 10/2012 |

(Continued)

OTHER PUBLICATIONS

International Search Report issued in Patent Application No. PCT/JP2022/025867 dated Aug. 30, 2022.

*Primary Examiner* — Emmanuel E Duke
(74) *Attorney, Agent, or Firm* — MCDONALD HOPKINS LLC

(57) ABSTRACT

Space purification device of the present disclosure includes electrolytic bath, electrode part, mixing bath, hypochlorous acid water supply part, water supply part, air blower, purification part, and controller. Controller determines a supply amount of a hypochlorous acid water by hypochlorous acid water supply part based on purification setting indicating a purification capability required of purification part and air volume setting.

19 Claims, 11 Drawing Sheets

(56) References Cited

FOREIGN PATENT DOCUMENTS

| | | |
|---|---|---|
| JP | 2019-024811 A | 2/2019 |
| JP | 2021-109079 A | 8/2021 |
| JP | 6917553 B1 | 8/2021 |
| WO | 2021/131660 A1 | 7/2021 |

* cited by examiner

FIG. 6A

|  |  | HUMIDITY | | |
|---|---|---|---|---|
|  |  | LESS THAN L1 | L1-L2 | L2 OR MORE |
| TEMPERATURE | LESS THAN K1 | F3 | F2 | F2 |
|  | K1-K2 | F2 | F2 | F1 |
|  | K2 OR MORE | F2 | F1 | F1 |

| ODOR LEVEL | AIR VOLUME |
|---|---|
| LV3 | F3 |
| LV2 | F2 |
| LV1 | F1 |

| ID | THRESHOLD VALUE |
|---|---|
| 2 | E1 |
| 3 | E2 |
| 4 | E3 |

| | | PURIFICATION SETTING | | |
|---|---|---|---|---|
| | | HIGH | MEDIUM | LOW |
| AIR VOLUME SETTING | F1 | B1 | C1 | D1 |
| | F2 | B2 | C2 | D2 |
| | F3 | B3 | C3 | D3 |

|  |  | PURIFICATION SETTING | | |
|---|---|---|---|---|
|  |  | HIGH | MEDIUM | LOW |
| AVERAGE VALUE OF AIR VOLUME SETTING | F1 | 2 | 2 | 2 |
|  | F2 | 3 | 3 | 2 |
|  | F3 | 4 | 4 | 3 |

| ID | SUPPLY AMOUNT |
|---|---|
| 0 | STOP |
| 1 | TEMPORARY STOP |
| 2 | A1 |
| 3 | A2 |
| 4 | A3 |

| F1 | HUMIDITY | | |
|---|---|---|---|
| | LESS THAN G1 | G1-G2 | G2 OR MORE |
| TEMPERATURE LESS THAN M1 | H1 | H4 | H7 |
| TEMPERATURE M1-M2 | H2 | H5 | H8 |
| TEMPERATURE M2 OR MORE | H3 | H6 | H9 |

| F2 | HUMIDITY | | |
|---|---|---|---|
| | LESS THAN G1 | G1-G2 | G2 OR MORE |
| TEMPERATURE LESS THAN M1 | I1 | I4 | I7 |
| TEMPERATURE M1-M2 | I2 | I5 | I8 |
| TEMPERATURE M2 OR MORE | I3 | I6 | I9 |

| F3 | HUMIDITY | | |
|---|---|---|---|
| | LESS THAN G1 | G1-G2 | G2 OR MORE |
| TEMPERATURE LESS THAN M1 | J1 | J4 | J7 |
| TEMPERATURE M1-M2 | J2 | J5 | J8 |
| TEMPERATURE M2 OR MORE | J3 | J6 | J9 |

530

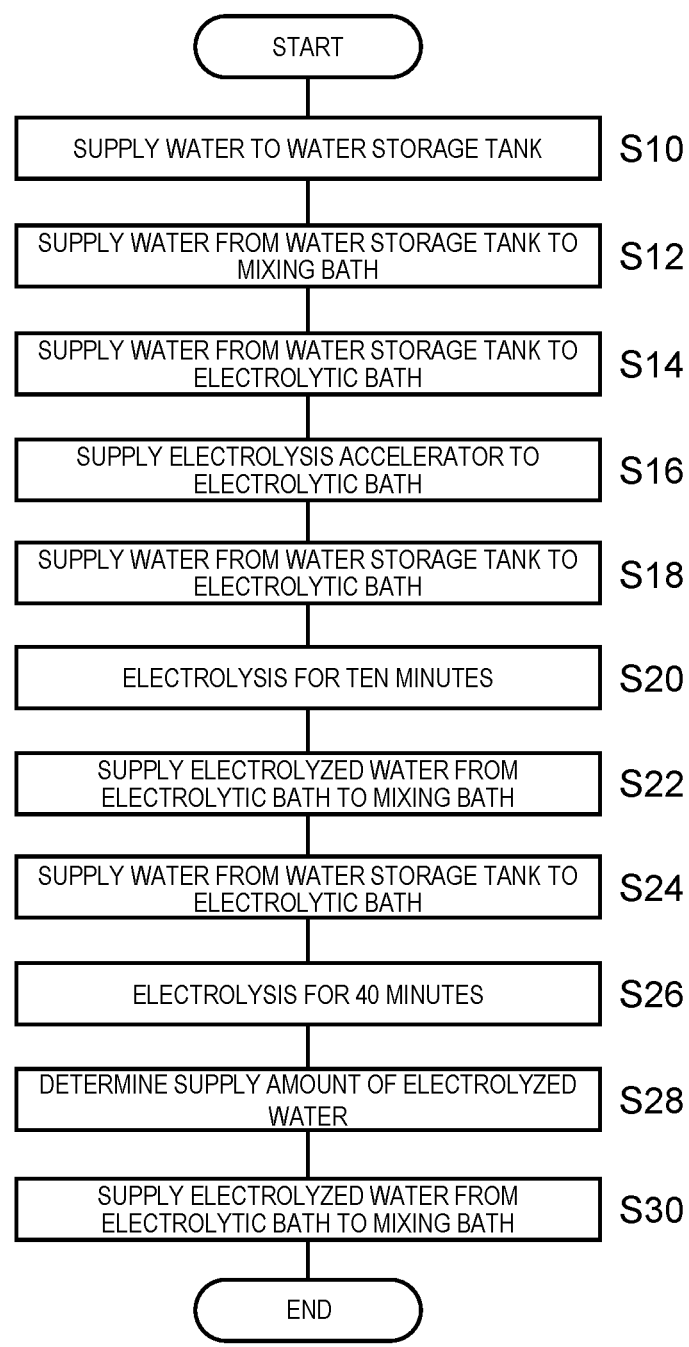

SPACE PURIFICATION DEVICE

TECHNICAL FIELD

The present disclosure relates to a space purification device that releases active oxygen species into a space.

BACKGROUND ART

In order to remove (including inactivation of) bacteria, fungi, viruses, odors, and the like in air, a space purification device that generates electrolyzed water containing hypochlorous acid by electrolysis and releases the electrolyzed water is known (see, e.g., PTL 1). For generation of hypochlorous acid, it is necessary to input an electrolysis accelerator such as salt to water that is a target of electrolysis to generate water containing chloride ions.

CITATION LIST

Patent Literature

PTL 1: Unexamined Japanese Patent Publication No. 2019-24811

SUMMARY OF THE INVENTION

A space purification device is desired to release an optimum amount of active oxygen species according to a use environment in a room in which the space purification device is installed.

An object of the present disclosure is to provide a technique for releasing active oxygen species in an amount suitable for a use environment.

A space purification device according to an aspect of the present disclosure includes: an electrolytic bath that stores water supplied from outside; an electrode part that is provided in the electrolytic bath and generates hypochlorous acid water having a predetermined concentration from the water stored in the electrolytic bath; a mixing bath that mixes the hypochlorous acid water and water to generate mixed water; a hypochlorous acid water supply part that supplies the hypochlorous acid water from the electrolytic bath to the mixing bath; a water supply part that supplies the water to the mixing bath; an air blower that takes in air from an air suction port based on preset air volume setting; a purification part that brings the mixed water stored in the mixing bath into contact with the air taken in from the air suction port; and a controller that controls the electrode part, the hypochlorous acid water supply part, the water supply part, and the air blower. The controller determines a supply amount of the hypochlorous acid water to be supplied by the hypochlorous acid water supply part based on purification setting indicating a purification capability required of the purification part and the air volume setting.

A space purification device according to another aspect of the present disclosure includes: an electrolytic bath that stores water supplied from outside; an electrode part that is provided in the electrolytic bath and generates hypochlorous acid water having a predetermined concentration from the water stored in the electrolytic bath; a mixing bath that mixes the hypochlorous acid water and water to generate mixed water; a hypochlorous acid water supply part that supplies the hypochlorous acid water from the electrolytic bath to the mixing bath; a water supply part that supplies the water to the mixing bath; an air blower that takes in air from an air suction port based on preset air volume setting; a purification part that brings the mixed water stored in the mixing bath into contact with the air taken in from the air suction port; and a controller that controls the electrode part, the hypochlorous acid water supply part, the water supply part, and the air blower. The controller determines a supply amount of next hypochlorous acid water to be supplied by the hypochlorous acid water supply part based on purification setting indicating a purification capability required of the purification part, the air volume setting after previous timing at which the hypochlorous acid water has been previously supplied, and an elapsed time from the previous timing.

A space purification device according to a further aspect of the present disclosure includes: an electrolytic bath that stores water supplied from outside; an electrode part that is provided in the electrolytic bath and generates hypochlorous acid water having a predetermined concentration from the water stored in the electrolytic bath; a mixing bath that mixes the hypochlorous acid water and water to generate mixed water; a hypochlorous acid water supply part that supplies the hypochlorous acid water from the electrolytic bath to the mixing bath; a water supply part that supplies the water to the mixing bath; an air blower that takes in air from an air suction port based on preset air volume setting; a purification part that brings the mixed water stored in the mixing bath into contact with the air taken in from the air suction port; and a controller that controls the electrode part, the hypochlorous acid water supply part, the water supply part, and the air blower. The controller includes an air volume determination part that determines the air volume setting to be set to the air blower. The air volume determination part determines the air volume setting based on environmental variables.

Any combinations of the above-described components, and conversion of the expressions of the present disclosure into methods, devices, systems, recording media, or computer programs are also effective as modes of the present disclosure.

According to the present disclosure, active oxygen species can be released in an amount suitable for a use environment.

BRIEF DESCRIPTION OF THE DRAWINGS

FIG. 6A is a diagram showing a data structure of a table stored in a storage part according to the exemplary embodiment of the present disclosure.

FIG. 6B is a diagram showing a data structure of a table stored in the storage part according to the exemplary embodiment of the present disclosure.

FIG. 7A is a diagram showing a data structure of another table stored in the storage part according to the exemplary embodiment of the present disclosure.

FIG. 7B is a diagram showing a data structure of a further table stored in the storage part according to the exemplary embodiment of the present disclosure.

FIG. 8A is a diagram showing a data structure of a still further table stored in the storage part according to the exemplary embodiment of the present disclosure.

FIG. 8B is a diagram illustrating a data structure of a still further table stored in the storage part according to the exemplary embodiment of the present disclosure.

FIG. 9A is a diagram illustrating a data structure of a still further table stored in the storage part according to the exemplary embodiment of the present disclosure.

FIG. 9B is a diagram showing a data structure of a still further table stored in the storage part according to the exemplary embodiment of the present disclosure.

FIG. 9C is a diagram showing a data structure of a still further table stored in the storage part according to the exemplary embodiment of the present disclosure.

FIG. 10 is a flowchart showing a control procedure by the space purification device according to the exemplary embodiment of the present disclosure.

DESCRIPTION OF EMBODIMENT

Prior to specific description of an exemplary embodiment of the present disclosure, an outline of the exemplary embodiment will be described. The present exemplary embodiment relates to a space purification device that generates electrolyzed water based on water and an electrolysis accelerator and then releases the electrolyzed water. A conventional space purification device generates water containing chloride ions by dissolving an electrolysis accelerator into water in a water storage part, and then generates electrolyzed water containing active oxygen species by electrolyzing the water containing chloride ions by electric conduction to an electrode. In a space purification device, generated electrolyzed water and air sucked from outside are continuously brought into contact with each other in a water storage part, and then, the air brought into contact is released to the outside by rotation of a fan. Therefore, electrolyzed water in the water storage part is easily contaminated due to contact with air. When the electrolyzed water is contaminated, the electrodes might be deteriorated.

In order to suppress deterioration of the electrodes, in the space purification device according to the present exemplary embodiment, a conventional water storage part is divided into two water tanks, an electrolytic bath and a mixing bath. The electrolytic bath is provided with electrodes, and the electrodes electrolyze water containing chloride ions to generate electrolyzed water in the electrolytic bath. The electrolyzed water generated in the electrolytic bath is supplied to the mixing bath. Furthermore, in the mixing bath, the electrolyzed water from the electrolytic bath and air sucked from outside are continuously brought into contact with each other, and then the air brought into contact is released to the outside by rotation of a fan. With such configuration, the electrolyzed water in the electrolytic bath does not come into contact with air, making the electrolyzed water less likely to be contaminated, and suppressing the electrodes from deteriorating.

Furthermore, when the space purification device is installed in a room, the space purification device is desired to release active oxygen species in an amount suitable for a use environment. Specifically, the space purification device is required to release a large amount of active oxygen species when a large amount of hypochlorous acid is required in a room, and to suppress the release of active oxygen species when not necessary. Therefore, the space purification device according to the present exemplary embodiment appropriately determines a supply amount from an electrolytic bath to a mixing bath, and executes adjustment to optimize a concentration of the mixing bath.

Figure 1:
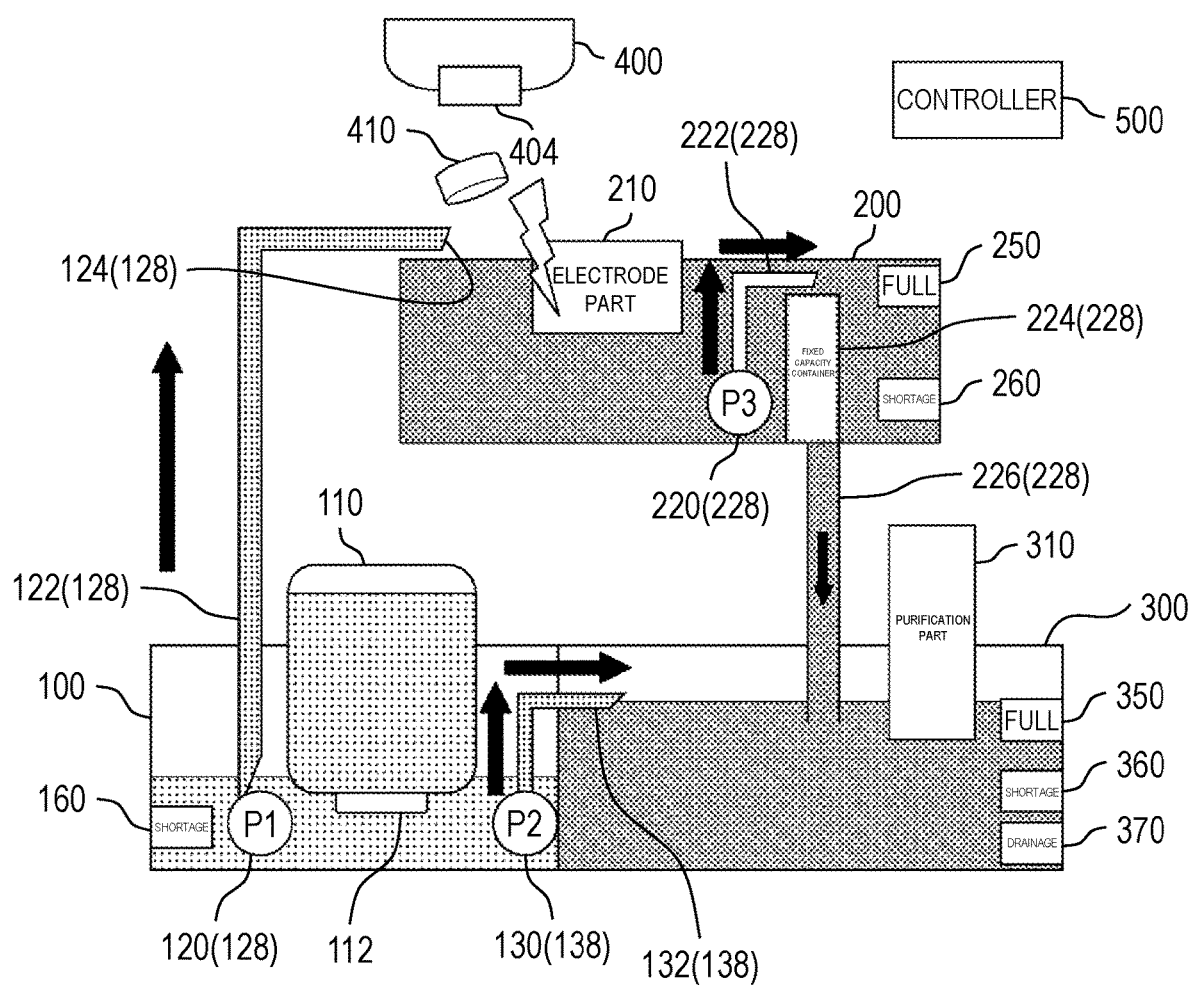
FIG. 1 is a view illustrating an internal configuration of a space purification device according to an exemplary embodiment of the present disclosure.

In the following, a mode for carrying out the present disclosure will now be described with reference to the accompanying drawings. FIG. 1 is a view illustrating an internal configuration of space purification device 1000 according to an exemplary embodiment of the present disclosure.

Space purification device 1000 includes water storage tank 100, water supply tank 110, lid 112, first pump 120, first water supply pipe 122, supply port 124, second pump 130, second water supply pipe 132, water shortage float 160, electrolytic bath 200, electrode part 210, third pump 220, third water supply pipe 222, fixed capacity container 224, third water supply pipe 226, full water float 250, water shortage float 260, mixing bath 300, purification part 310, full water float 350, water shortage float 360, drainage float 370, electrolysis accelerator input part 400, input port 404, electrolysis accelerator 410, and controller 500. Here, first pump 120, first water supply pipe 122, and supply port 124 are included in first supply part 128, second pump 130 and second water supply pipe 132 are included in second supply part 138, and third pump 220, third water supply pipe 222, fixed capacity container 224, and third water supply pipe 226 are included in third supply part 228. In the following, (1) basic configuration, (2) initial processing, (3) regular processing, (4) reprocessing, (5) air volume control processing, (6) first water feeding processing, and (7) second water feeding processing will be described in this order.

(1) Basic Configuration

Water storage tank 100 has a box shape with a top face opened, and has a structure enabling storage of water to store water supplied from water supply tank 110 to be described later. Water storage tank 100 is disposed in, for example, a lower part of space purification device 1000. Water supply tank 110 is a tank that internally stores water, and is detachable from water storage tank 100. An opening (not illustrated) of water supply tank 110 is provided with lid 112, and at a center of lid 112, an opening and closing part (not illustrated) is provided. When the opening and closing part is opened, water in water supply tank 110 is supplied to water storage tank 100.

Specifically, when water supply tank 110 is attached to water storage tank 100 with the opening of water supply tank 110 facing downward, the opening and closing part is opened. In other words, when water supply tank 110 containing water is attached to water storage tank 100, the opening and closing part is opened to supply water to water storage tank 100, and the water collects in water storage tank 100. When a water level in water storage tank 100 rises and reaches lid 112, the water supply is stopped because the opening of water supply tank 110 is water-sealed. When water remains inside water supply tank 110, the water in water supply tank 110 is supplied to water storage tank 100 every time the water level in water storage tank 100 drops. As a result, the water level in water storage tank 100 is kept constant.

First pump 120 is disposed in water storage tank 100, and is connected to first water supply pipe 122. When operating in response to an instruction from controller 500, first pump 120 pumps up water stored in water storage tank 100 toward first water supply pipe 122. First water supply pipe 122 is a pipe connecting water storage tank 100 and electrolytic bath 200, and has supply port 124 at an end on electrolytic bath 200 side. The water pumped up by first pump 120 flows in first water supply pipe 122, and is supplied from supply port 124 to electrolytic bath 200. In other words, first pump 120, first water supply pipe 122, and supply port 124 supply water from water storage tank 100 to electrolytic bath 200.

Second pump 130 is disposed in water storage tank 100, and is connected to second water supply pipe 132. When operating in response to an instruction from controller 500, second pump 130 pumps up water stored in water storage tank 100 toward second water supply pipe 132. Second water supply pipe 132 is a pipe connecting water storage tank 100 and mixing bath 300. The water pumped up by second pump 130 flows in second water supply pipe 132, and is supplied to mixing bath 300. In other words, second pump 130 and second water supply pipe 132 supply water from water storage tank 100 to mixing bath 300.

Electrolytic bath 200 has a box shape with a top face opened, and is disposed below supply port 124. Electrolytic bath 200 stores water supplied from supply port 124. Above electrolytic bath 200, electrolysis accelerator input part 400 is disposed side by side with supply port 124.

Electrolysis accelerator input part 400 can be internally loaded with electrolysis accelerator 410, and rotates a tablet input member (not illustrated) upon receiving an input instruction of electrolysis accelerator 410 from controller 500. When the tablet input member rotates, electrolysis accelerator 410 drops into electrolytic bath 200. Electrolysis accelerator input part 400 counts the number of electrolysis accelerators 410 dropped into electrolytic bath 200, and stops the rotation of the tablet input member upon determining that one tablet of electrolysis accelerator 410 has dropped into electrolytic bath 200. In other words, electrolysis accelerator input part 400 inputs electrolysis accelerator 410 into electrolytic bath 200. When electrolysis accelerator 410 dissolves into water in electrolytic bath 200, water containing chloride ions is generated in electrolytic bath 200. One example of electrolysis accelerator 410 is sodium chloride and is formed as an electrolysis acceleration tablet.

Electrode part 210 is installed in a manner to be immersed in water in electrolytic bath 200. By being electrically conducted, electrode part 210 electrochemically electrolyzes water containing chloride ions in electrolytic bath 200 to generate electrolyzed water containing active oxygen species. Here, the active oxygen species represents oxygen molecules having an oxidation activity higher than an oxidation activity of normal oxygen, and substances related thereto. For example, in addition to what is called a narrow sense of active oxygen such as superoxide anion, singlet oxygen, hydroxyl radical, or hydrogen peroxide, the active oxygen species include what is called a broad sense of active oxygen such as ozone or hypochlorous acid (hypohalous acid).

Electrode part 210 may generate electrolyzed water by repeating one cycle a plurality of times, one cycle having electric conduction time for performing electric conduction for electrolysis and time after stopping the electric conduction, i.e., non-electric conduction time that is time when the electric conduction is not performed. By providing the non-electric conduction time for electrode part 210, a life of electrode part 210 is extended. When the electric conduction time is lengthened with respect to the non-electric conduction time, electrolyzed water containing a larger amount of active oxygen species is generated per cycle. When the non-electric conduction time is lengthened with respect to the electric conduction time, generation of active oxygen species per cycle can be suppressed. Furthermore, when an amount of electricity in the electric conduction time is increased, electrolyzed water containing a further larger amount of active oxygen species is generated. As described above, it can be said that electrolytic bath 200 is a tank for generating electrolyzed water from water into which electrolysis accelerator 410 is input. Electrolyzed water is also referred to as hypochlorous acid water, and hypochlorous acid water having a predetermined concentration is generated in electrolytic bath 200.

Third pump 220 is disposed in electrolytic bath 200, and is connected to third water supply pipe 222. When operating in response to an instruction from controller 500, third pump 220 pumps up electrolyzed water stored in electrolytic bath 200 toward third water supply pipe 222. Third water supply pipe 222 is connected to fixed capacity container 224, and supplies the electrolyzed water in electrolytic bath 200 to fixed capacity container 224. Fixed capacity container 224 is a measuring container having a fixed capacity, and stores a fixed volume of electrolyzed water supplied from third water supply pipe 222. Fixed capacity container 224 is connected to third water supply pipe 226, and third water supply pipe 226 extends toward mixing bath 300. Electrolyzed water stored in fixed capacity container 224 flows in third water supply pipe 226 and is supplied to mixing bath 300. In other words, third pump 220, third water supply pipe 222, fixed capacity container 224, and third water supply pipe 226 supply electrolyzed water from electrolytic bath 200 to mixing bath 300.

Mixing bath 300 has a box shape with a top face opened, and mixes water supplied from water storage tank 100 and electrolyzed water supplied from electrolytic bath 200 to generate mixed water. This corresponds to diluting the electrolyzed water supplied from electrolytic bath 200 with the water supplied from water storage tank 100. Mixing bath 300 is provided with purification part 310.

Purification part 310 includes a fan (not illustrated) and a filter (filter). The fan is, for example, a sirocco fan, and rotates under the control of controller 500. An air volume of the fan is determined every air volume unit time (e.g., five minutes) according to temperature, humidity, and an odor level of a gas. A rotation speed of the fan is controlled based on the determined air volume. As the fan rotates, air is sucked into space purification device 1000 from an air suction port (not illustrated) provided in a casing (not illustrated) of space purification device 1000.

The filter is a member that brings the electrolyzed water stored in mixing bath 300 into contact with indoor air having flowed into space purification device 1000 by the fan. The electrolyzed water stored in mixing bath 300 can be also said to be mixed water of hypochlorous acid water and water. The filter is formed in a cylindrical shape, and has a circumferential part where holes through which air can flow are provided. The filter is rotatably incorporated in mixing bath 300 with a central axis as a rotation center so that one end of the filter is immersed in the electrolyzed water stored in mixing bath 300 to retain water. The filter is rotated by a driving part (not illustrated) to bring the electrolyzed water and the indoor air into continuous contact with each other.

An air path leading from the air suction port to the filter, the fan, and a blow-out port (not illustrated) is formed. When the fan rotates, external air having been sucked from the air suction port and having entered the air path is blown out to the outside of space purification device 1000 sequentially via the filter, the fan, and the blow-out port. As a result, the air brought into contact with the electrolyzed water in mixing bath 300 is released to the outside. Space purification device 1000 releases active oxygen species derived from the electrolyzed water having been generated (including volatilization) together with the air.

Water shortage float 160 provided in water storage tank 100, full water float 250 and water shortage float 260 provided in electrolytic bath 200, and full water float 350, water shortage float 360, and drainage float 370 provided in mixing bath 300 each detect whether or not water or electrolyzed water is present. Here, water and electrolyzed water may be collectively referred to as "water". Water shortage float 160, full water float 250, water shortage float 260, full water float 350, water shortage float 360, and drainage float 370 are collectively referred to as "float". Each of the floats has buoyancy and a magnet (not illustrated), and a position of the magnet is detected by a detection part (not illustrated). In a case where water is present up to a position of the float, the float moves to a predetermined position by buoyancy, and the detection part detects the magnet provided on the float part. On the other hand, in a case where no water is present up to the position of the float, the detection part cannot detect the magnet provided on the float.

Water shortage float 160 detects water shortage of water storage tank 100, full water float 250 detects full water of electrolytic bath 200, and water shortage float 260 detects water shortage of electrolytic bath 200. Here, the water shortage does not have to be a 100% water shortage, and allows a slight amount of water to remain. In addition, full water float 350 detects full water of mixing bath 300, water shortage float 360 detects water shortage of mixing bath 300, and drainage float 370 detects a drainage level of mixing bath 300. Here, the full water does not have to be 100% full water, and may be a water amount at which water can be further input. Each float transmits a detection result to controller 500.

Controller 500 receives detection results from water shortage float 160, full water float 250, water shortage float 260, full water float 350, water shortage float 360, and drainage float 370. Controller 500 executes control of electrode part 210, purification part 310, electrolysis accelerator input part 400, first supply part 128, second supply part 138, and third supply part 228. Details of processing of controller 500 will be described later.

As an example, a concentration of electrolyzed water to be generated in electrolytic bath 200 is a concentration within a range of 30 ppm to 200 ppm (hereinafter, referred to as "first concentration"), and a concentration of electrolyzed water to be diluted in mixing bath 300 is a concentration within a range of 3 ppm to 50 ppm. The concentration of the electrolyzed water to be diluted in mixing bath 300 is set to be lower than the concentration of the electrolyzed water to be generated in electrolytic bath 200.

(2) Initial Processing

The initial processing is processing of executing release of the electrolyzed water at an initial stage in a state in which water storage tank 100, electrolytic bath 200, and mixing bath 300 have no water. In the following, the initial processing will be described also with reference to FIGS. 2A to 2C, 3A, and 3B.

Figure 2A:
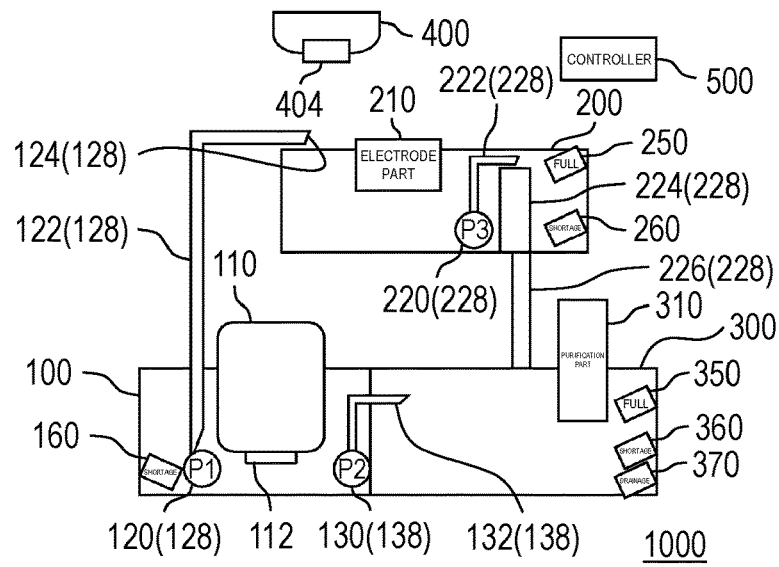
FIG. 2A is a view illustrating an operation outline of the space purification device according to the exemplary embodiment of the present disclosure.
Figure 2B:
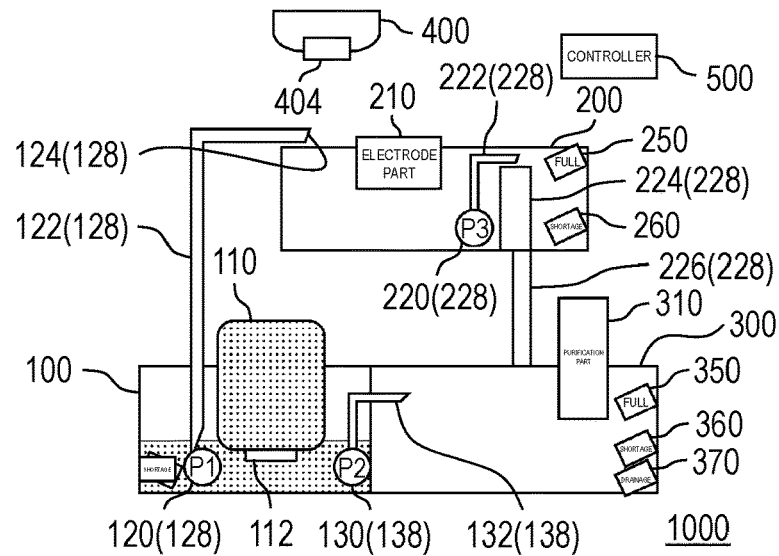
FIG. 2B is a view illustrating the operation outline of the space purification device according to the exemplary embodiment of the present disclosure.
Figure 2C:
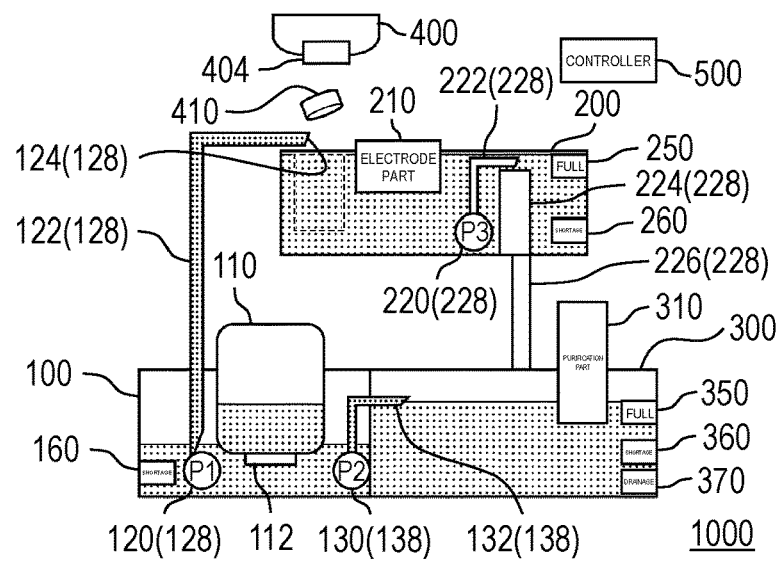
FIG. 2C is a view illustrating the operation outline of the space purification device according to the exemplary embodiment of the present disclosure.

FIGS. 2A to 2C illustrate an operation outline of space purification device 1000. FIG. 2A illustrates a state where water storage tank 100, electrolytic bath 200, and mixing bath 300 have no water. This corresponds to a case where space purification device 1000 is installed after space purification device 1000 is purchased. This also corresponds to a case after maintenance such as cleaning of water storage tank 100, electrolytic bath 200, and the mixing bath 300 is executed.

FIG. 2B illustrates a state following FIG. 2A. A user pours water into water supply tank 110, and attaches water supply tank 110 to water storage tank 100. When water supply tank 110 is attached to water storage tank 100, water is supplied from water supply tank 110 to water storage tank 100 as a result of opening of the opening and closing part of lid 112.

FIG. 2C illustrates a state following FIG. 2B. By operating second pump 130, controller 500 supplies water in water storage tank 100 to mixing bath 300. The water is supplied until full water float 350 detects full water. As a result, mixing bath 300 stores water in a state of being full water.

By operating first pump 120, controller 500 supplies water in water storage tank 100 to electrolytic bath 200. On this occasion, water is supplied for a certain period of time for which electrolytic bath 200 does not become full of water. As a result of the water supply, a water surface of electrolytic bath 200 is present at a water level lower than a water level of full water. A supply region 240 is disposed on a part of the water surface of electrolytic bath 200, and supply region 240 is located below supply port 124 and input port 404. After the water supply is ended, controller 500 causes electrolysis accelerator 410 to be dropped from input port 404 toward supply region 240 of electrolytic bath 200. As a result, electrolysis accelerator 410 is present in supply region 240 and begins to dissolve in water.

Subsequently, by operating first pump 120 again, controller 500 supplies water in water storage tank 100 to electrolytic bath 200. On this occasion, supply of water from supply port 124 toward supply region 240 further promotes the dissolution of electrolysis accelerator 410 by a pressure of the supplied water. The water is supplied until full water float 250 detects full water. As a result, mixing bath 300 stores water containing chloride ions in which some or all of electrolysis accelerators 410 are dissolved in a state of full water.

Figure 3A:
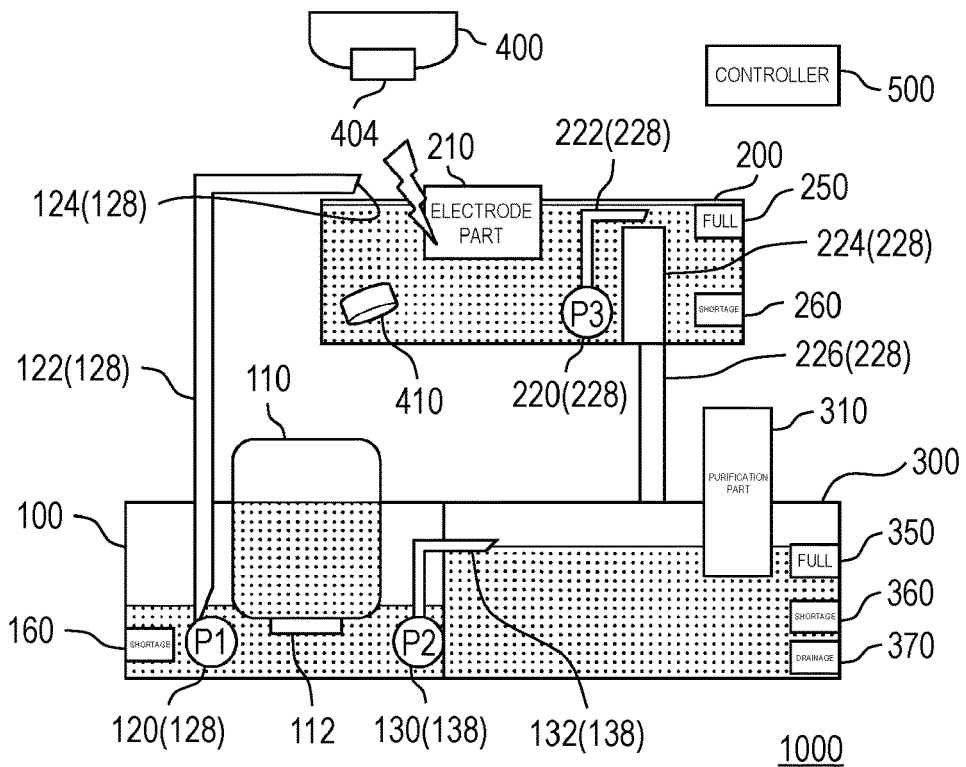
FIG. 3A is a view illustrating the operation outline of the space purification device according to the exemplary embodiment of the present disclosure.
Figure 3B:
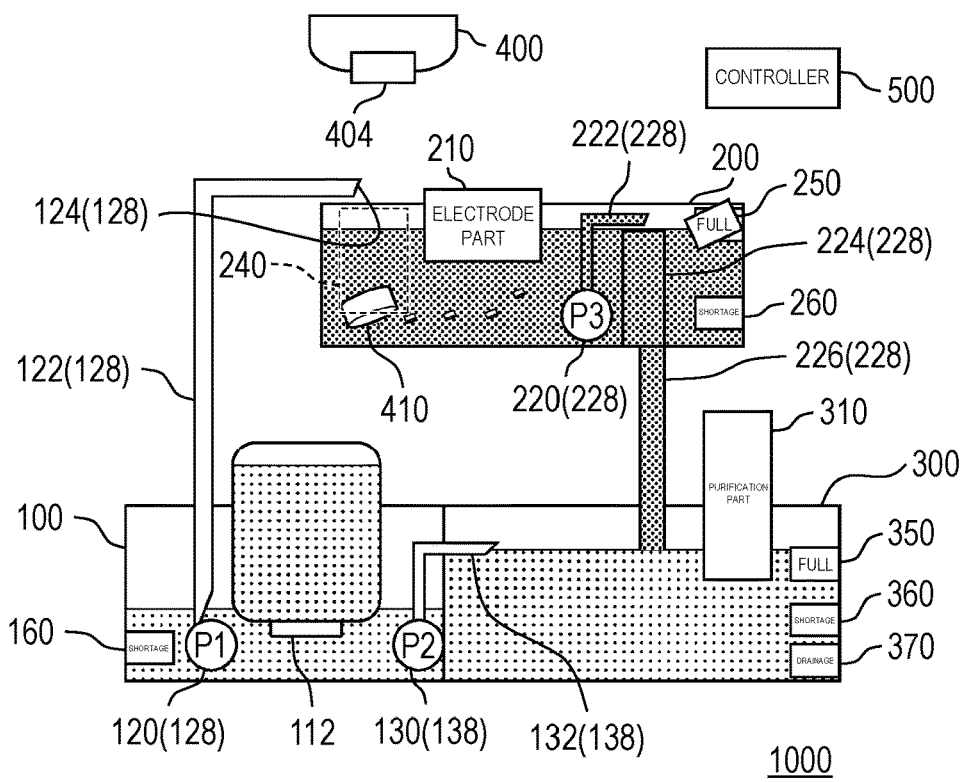
FIG. 3B is a view illustrating the operation outline of the space purification device according to the exemplary embodiment of the present disclosure.

FIGS. 3A and 3B illustrate an operation outline of space purification device 1000 following FIGS. 2A to 2C. FIG. 3A illustrates a state following FIG. 2C. By executing electric conduction to electrode part 210, controller 500 electrolyzes water containing chloride ions to generate electrolyzed water. Here, an electrolysis time is set to a time (e.g., ten minutes) shorter than a time (e.g., 40 minutes) required for generating electrolyzed water having a first concentration. As a result, electrolyzed water having a second concentration lower than the first concentration is generated.

FIG. 3B illustrates a state following FIG. 3A. When the electrolyzed water having the second concentration is generated, controller 500 supplies the electrolyzed water having the second concentration to mixing bath 300 by operating third pump 220. On this occasion, since fixed capacity container 224 is used, the electrolyzed water having the second concentration corresponding to the capacity of fixed capacity container 224 is supplied to mixing bath 300. The electrolyzed water having the second concentration is diluted in mixing bath 300. By stopping third pump 220 and then operating purification part 310, controller 500 releases the air brought into contact with the electrolyzed water in mixing bath 300 to the outside of space purification device 1000. In other words, release of the air brought into contact with the electrolyzed water is started from a time shorter than 40 minutes.

(3) Regular Processing

Figure 4A:
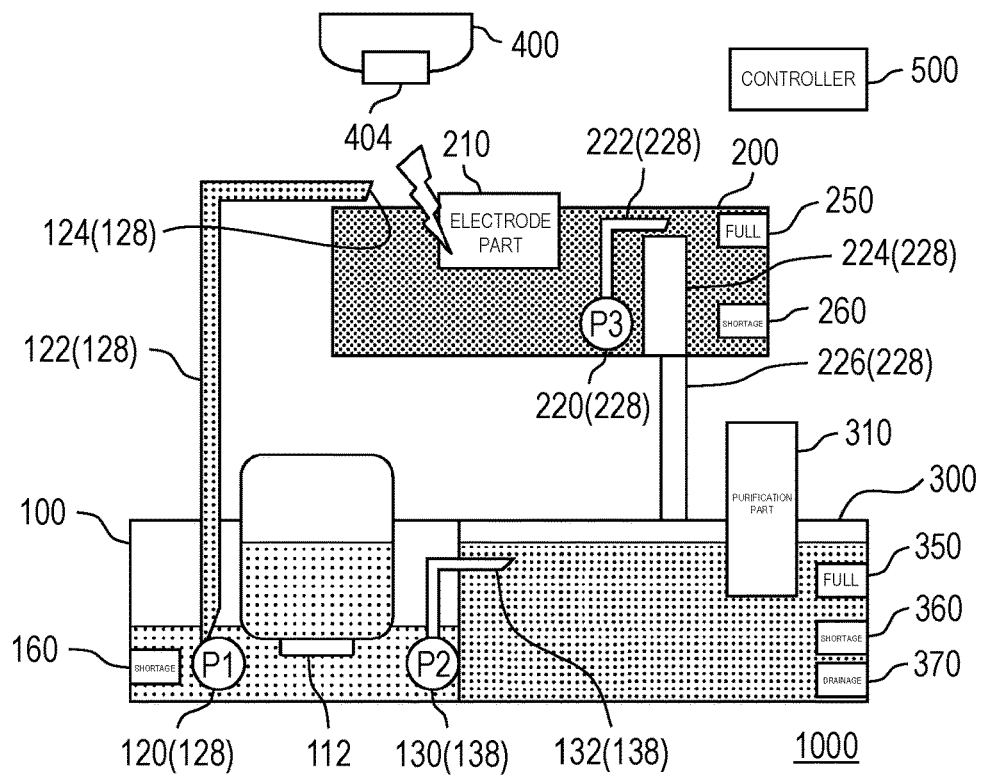
FIG. 4A is a view illustrating the operation outline of the space purification device according to the exemplary embodiment of the present disclosure.
Figure 4B:
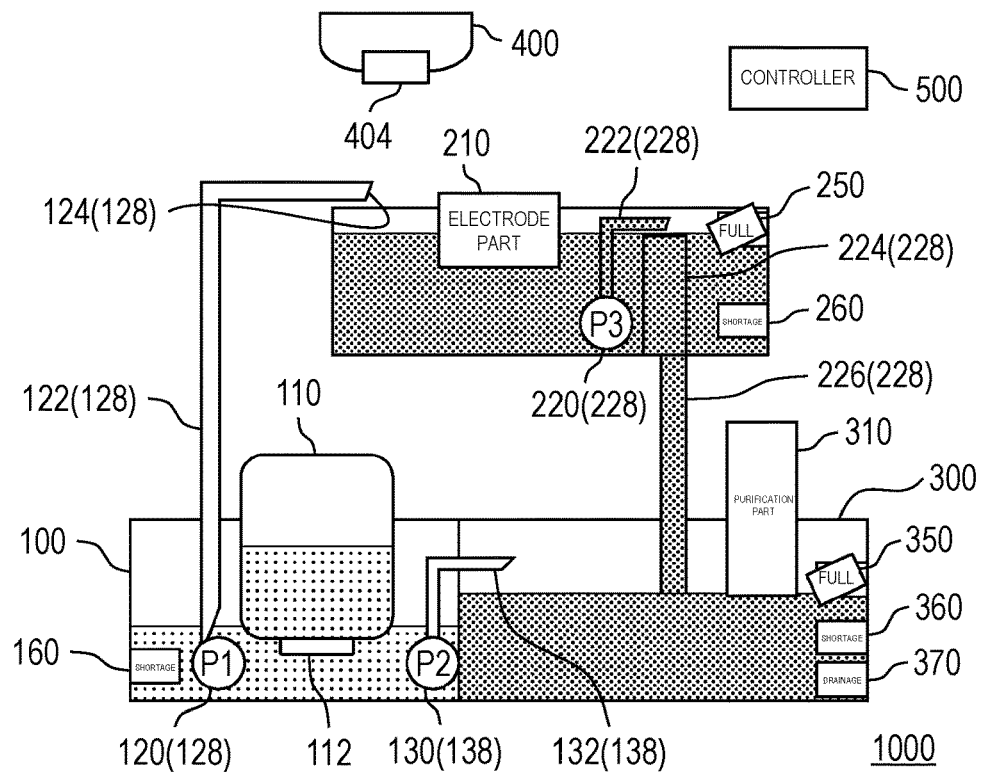
FIG. 4B is a view illustrating the operation outline of the space purification device according to the exemplary embodiment of the present disclosure.

The regular processing is processing for releasing electrolyzed water of a desired concentration. FIGS. 4A and 4B illustrate an operation outline of space purification device 1000 following FIGS. 3A and 3B. FIG. 4A illustrates a state following FIG. 3B. Since a part of the electrolyzed water having the second concentration in electrolytic bath 200 has been supplied to mixing bath 300, the electrolyzed water having the second concentration is stored in electrolytic bath 200 in a state of not being full water. By operating first pump 120, controller 500 supplies water in water storage tank 100 to electrolytic bath 200. On this occasion, since water is supplied from supply port 124 toward supply region 240, remaining electrolysis accelerator 410 yet to dissolve is further dissolved by a pressure of the supplied water. The water is supplied until full water float 250 detects full water. This resultantly brings electrolytic bath 200 into a full water state. After the water supply to electrolytic bath 200 has ended, controller 500 generates electrolyzed water by electrolysis by executing electric conduction to electrode part 210. Here, the electrolysis time is set to be a time (e.g., 40 minutes) required for generating the electrolyzed water having the first concentration. As a result, the electrolyzed water having the first concentration is generated.

FIG. 4B illustrates a state following FIG. 4A. When the electrolyzed water having the first concentration is generated, controller 500 supplies the electrolyzed water having the first concentration to mixing bath 300 by operating third pump 220. On this occasion, controller 500 controls an amount of the electrolyzed water to be supplied to mixing bath 300, and details of the control will be described later. The electrolyzed water having the first concentration is diluted in mixing bath 300. By stopping third pump 220 and then operating purification part 310, controller 500 releases the air brought into contact with the electrolyzed water in mixing bath 300 to the outside of space purification device 1000.

When the air brought into contact with the electrolyzed water is released, the amount of the electrolyzed water in mixing bath 300 decreases. Although to be described in detail later, controller 500 determines supply timing and a supply amount of the electrolyzed water to be supplied to mixing bath 300, and supplies the electrolyzed water having the first concentration to mixing bath 300 by operating third pump 220. When mixing bath 300 is not full of water, controller 500 further operates second pump 130 to supply water in water storage tank 100 to mixing bath 300 until mixing bath 300 becomes full of water. This causes release of the electrolyzed water to be continued. Such processing is repeated until water shortage float 260 detects water shortage.

(4) Reprocessing

The reprocessing is processing for executing the regular processing again when water shortage float 260 detects water shortage, i.e., when the electrolyzed water in electrolytic bath 200 becomes short. When water shortage float 260 detects water shortage after the electrolyzed water having the first concentration is supplied to mixing bath 300, controller 500 starts supplying water to electrolytic bath 200 by first supply part 128. In other words, controller 500 does not supply water to electrolytic bath 200 until electrolytic bath 200 becomes short of water. This is for maintaining the concentration of the electrolyzed water in electrolytic bath 200 at the first concentration by refraining from supplying water. This is also for making impurities such as inorganic salt compounds be less likely to remain in electrolytic bath 200 by making old electrolyzed water hardly remain in electrolytic bath 200. As a result, a maintenance frequency of electrolytic bath 200 is reduced.

Here, similarly to the initial processing, controller 500 executes water supply for a certain period of time for which electrolytic bath 200 is not filled to full water. Subsequently, controller 500 causes electrolysis accelerator 410 to be dropped from input port 404 toward supply region 240 of electrolytic bath 200, and executes water supply until electrolytic bath 200 becomes full of water. By executing electric conduction to electrode part 210, controller 500 also generates electrolyzed water having the second concentration, and then supplies the electrolyzed water having the second concentration from electrolytic bath 200 to mixing bath 300. In other words, the same processing as a part of the initial processing is executed. Subsequently, the regular processing is executed.

(5) Air Volume Control Processing

Figure 5:
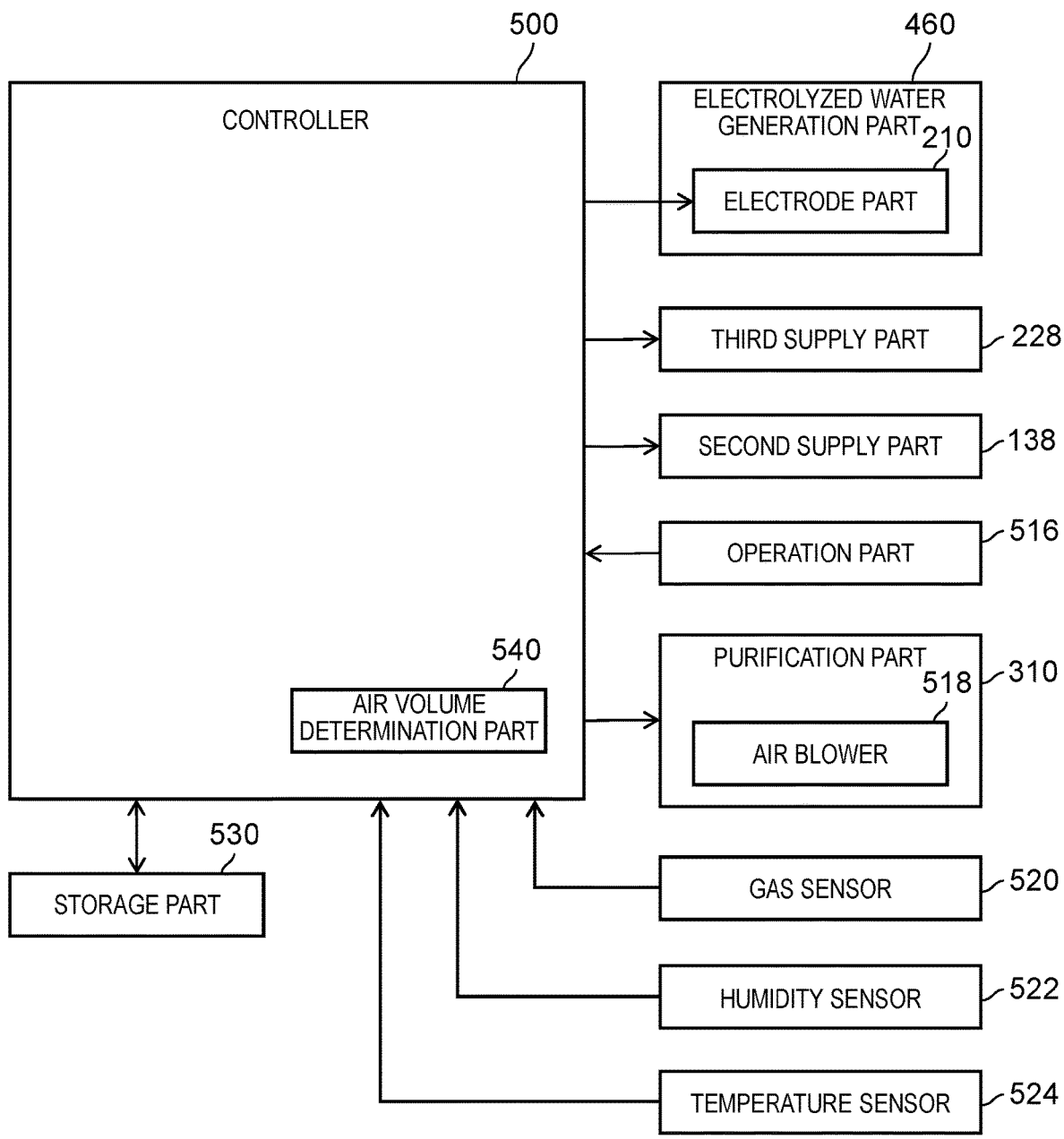
FIG. 5 is a diagram illustrating functional blocks of the space purification device according to the exemplary embodiment of the present disclosure.

FIG. 5 illustrates functional blocks of space purification device 1000. Space purification device 1000 includes second supply part 138, third supply part 228, purification part 310, electrolyzed water generation part 460, controller 500, operation part 516, gas sensor 520, humidity sensor 522, temperature sensor 524, and storage part 530. Purification part 310 includes air blower 518. Note that air blower 518 may be provided outside purification part 310. Electrolyzed water generation part 460 includes electrode part 210, and controller 500 includes air volume determination part 540.

The air volume control processing is processing for controlling an air volume of air blower 518 included in purification part 310, i.e., the rotation speed of the fan described above. Gas sensor 520 detects gas present in a space in which space purification device 1000 is installed. Gas sensor 520 may detect gas present in air sucked from the air suction port. In other words, gas sensor 520 may be provided in the space, or may be provided in the vicinity of a suction port of space purification device 1000. Gas sensor 520 may acquire a concentration of a gas to be detected. Examples of the gas to be detected include ammonia, acetic acid, isovaleric acid, trimethylamine, hydrogen sulfide, methyl mercaptan, and skatole. Temperature sensor 524 detects temperature of the space in which space purification device 1000 is installed. Temperature sensor 524 may detect temperature of air sucked from the air suction port. In other words, temperature sensor 524 may be provided in the space, or may be provided in the vicinity of the suction port of space purification device 1000. Humidity sensor 522 detects humidity of the space in which space purification device 1000 is installed. Humidity sensor 522 may detect humidity of air sucked from the air suction port. In other words, humidity sensor 522 may be provided in the space, or may be provided in the vicinity of the suction port of space purification device 1000. Gas sensor 520, temperature sensor 524, and humidity sensor 522 are provided at positions that are not affected by air containing electrolyzed water (or active oxygen species) blown out from the blow-out port (not illustrated). Gas sensor 520, temperature sensor 524, and humidity sensor 522 make it possible to accurately grasp a state of air (type of gas, concentration of gas, temperature, and humidity) at the place where space purification device 1000 is installed.

Air volume determination part 540 determines air volume setting to be set to air blower 518 for each air volume unit time based on at least one of the type of gas and the concentration of the gas acquired by gas sensor 520, and at least one of the humidity acquired by humidity sensor 522 and the temperature acquired by temperature sensor 524. At least one of the gas type and the gas concentration acquired by gas sensor 520, and at least one of the humidity acquired by humidity sensor 522 and the temperature acquired by temperature sensor 524 are also referred to as environmental variables.

Storage part 530 stores a table to be referred to by air volume determination part 540. FIGS. 6A and 6B show data structures of the tables stored in storage part 530. FIG. 6A shows an example of the table (hereinafter, referred to as a "temperature-and-humidity sensor output table"). The temperature-and-humidity sensor output table defines an air volume level (air volume setting) to be determined with respect to temperature and humidity when an air volume is determined. As illustrated in FIG. 6A, in the temperature-and-humidity sensor output table, temperature and humidity are respectively divided into a matrix within predetermined ranges, and air volume levels to be set are associated with the respective ranges. A threshold value for temperature is K1<K2 and a threshold value for humidity is L1<L2. In the example of FIG. 6A, the air volume level is shown in three stages of F1 to F3, where the air volume level of F3 is the highest and the air volume level of F1 is the lowest. The larger the value of the air volume level (the higher the air volume level), the larger the air volume.

For example, influenza tends to spread as temperature and humidity become lower. Therefore, in the temperature-and-humidity sensor output table illustrated in FIG. 6A, the air volume level is defined to be high at low temperature and low humidity so that influenza virus can be removed as the situation where the influenza easily spreads arises. When the air volume increases, an amount of active oxygen species per unit time contained in the air blown out from the blow-out port (not illustrated) increases, so that many viruses can be inactivated. Instead of the temperature-and-humidity sensor output table of FIG. 6A, storage part 530 may separately store a temperature sensor output table and a humidity sensor output table.

FIG. 6B shows another example of the table (hereinafter, referred to as a "gas sensor output table"). The gas sensor output table is a table to be referred to by air volume determination part 540, and defines an air volume level to be set with respect to the odor level when an air volume is set. As illustrated in FIG. 6B, in the gas sensor output table, air volume levels to be set are associated with odor levels LV1 to LV3. The odor level is set in three stages from LV1 for the weakest odor to LV3 for the strongest odor, and is determined by air volume determination part 540 according to a gas concentration detected by gas sensor 520. Similarly to FIG. 6A, the air volume level is indicated in three stages F1 to F3. In the gas sensor output table illustrated in FIG. 6B, the air volume level is defined to be higher as the odor level becomes higher so that the odor can be removed more reliably. The description returns to FIG. 5.

Air volume determination part 540 determines air volume level (1) to be set with respect to the temperature acquired by temperature sensor 524 and the humidity acquired by humidity sensor 522 from the temperature-and-humidity sensor output table. In addition, air volume determination part 540 determines an odor level from the gas concentration acquired by gas sensor 520, and determines air volume level (2) to be set for the odor level. Air volume determination part 540 determines a larger air volume level between air volume level (1) and air volume level (2) as an air volume level of air blower 518 in a next air volume unit time, and controls air blower 518 so as to have the larger air volume level.

Air blower 518 corresponds to the fan described above, and takes in air from the air suction port at the air volume setting set by air volume determination part 540.

(6) First Water Feeding Processing

The first water feeding processing is processing for operating third pump 220 of third supply part 228 in order to supply the electrolyzed water in electrolytic bath 200 to mixing bath 300. Third supply part 228 is also referred to as a hypochlorous acid water supply part, and the hypochlorous acid water supply part supplies hypochlorous acid water from electrolytic bath 200 to mixing bath 300. In order to optimize a hypochlorous acid concentration in mixing bath 300, the first water feeding processing includes (6-1) supply timing control and (6-2) supply amount control.

(6-1) Supply Timing Control

Controller 500 in FIG. 5 integrates consumption amounts of hypochlorous acid from after completion of supply of the previous electrolyzed water, and determines the supply of the electrolyzed water from electrolytic bath 200 to mixing bath 300 when an integrated value of the consumption amounts of hypochlorous acid becomes equal to or larger than a specified value.

FIGS. 7A and 7B show data structures of further tables stored in storage part 530. FIG. 7A illustrates a table for determining a threshold value. "ID" is identification information for identifying a supply amount. As an example, "ID" may take 2, 3, and 4. "ID=2" corresponds to a state in which a supply amount of electrolyzed water is the smallest, and "ID=4" corresponds to a state in which the supply amount of electrolyzed water is the largest. After the power of space purification device 1000 is turned on or after the reset is released, controller 500 selects a threshold value corresponding to "ID=2". On the other hand, other than the above, controller 500 selects a threshold value corresponding to the "ID" selected at the time of the previous supply. The threshold value corresponds to a supply amount of the electrolyzed water at previous timing. FIG. 7B will be described later, and the description returns to FIG. 5.

Operation part 516 is an interface such as a button, or a touch panel, and accepts user's operation. Operation part 516 receives purification setting in purification part 310 as the user's operation. The purification setting is an index indicating a purification capability required of purification part 310. For example, the purification setting is indicated in three stages of "high", "medium", and "low". The purification setting "high" is a state in which the required purification capability is the highest, and an amount of hypochlorous acid (active oxygen species) in air released from purification part 310 is set to be the highest. The purification setting "low" is a state in which the required purification capability is the lowest, and the amount of the hypochlorous acid (active oxygen species) in the air released from purification part 310 is set to be the lowest. Operation part 516 outputs the received purification setting to controller 500.

Controller 500 receives the air volume setting determined by air volume determination part 540 and receives the purification setting from operation part 516 every unit time after the previous timing, for example, every one minute.

Controller 500 calculates a consumption amount of electrolyzed water (or active oxygen species) per unit time based on the air volume setting and the purification setting. FIG. 7B is a table showing the consumption amounts of electrolyzed water (or active oxygen species) associated with the air volume setting "F1" to "F3" and the purification setting "high", "medium", and "low". For example, when the air volume setting is "F1" and the purification setting is "high", the consumption amount of the electrolyzed water (or active oxygen species) is indicated as "B1". The higher the air volume setting, the larger the consumption amount of the electrolyzed water (or active oxygen species) per unit time. The higher the purification setting, the larger the consumption amount of the electrolyzed water (or active oxygen species) per unit time. The description returns to FIG. 5.

Controller 500 integrates the consumption amount of the electrolyzed water (or active oxygen species) per unit time. When an integrated value of the consumption amounts becomes equal to or larger than the threshold value, controller 500 determines the supply of the electrolyzed water from electrolytic bath 200 to mixing bath 300. When the electrolyzed water is supplied, controller 500 clears the integrated value of the consumption amounts.

(6-2) Supply Amount Control

Controller 500 in FIG. 5 determines a supply amount of the electrolyzed water from electrolytic bath 200 to mixing bath 300 based on an average value of air volumes from the completion of the supply of the previous electrolyzed water to supplying the next electrolyzed water, and on the purification setting in purification part 310 when the electrolyzed water is supplied.

After the power of space purification device 1000 is turned on or after the reset is released, controller 500 receives the air volume setting from air volume determination part 540 and receives the purification setting from operation part 516. Controller 500 determines a supply amount of the electrolyzed water by third supply part 228 based on the purification setting and the air volume setting. FIGS. 8A and 8B show data structures of still further tables stored in storage part 530. FIG. 8A is a table showing "IDs" associated with average values "F1" to "F3" of air volume setting and purification setting "high", "medium", and "low". After the power of space purification device 1000 is turned on or after the reset is released, the air volume setting is used as the average value of the air volume setting. "ID" is the same as the "ID" shown in FIG. 7A. Controller 500 specifies "ID" based on the purification setting and the air volume setting. FIG. 8B will be described later, and the description returns to FIG. 5.

On the other hand, other than after the power of space purification device 1000 is turned on and after the reset is released, controller 500 receives air volume setting determined by air volume determination part 540 every unit time, e.g., every one minute after the previous timing at which the electrolyzed water has been previously supplied. Controller 500 integrates the air volume setting until supply of next electrolyzed water is determined. When the supply of the next electrolyzed water is determined, controller 500 calculates an average value of the air volume setting by dividing the integrated value of the air volume setting by an elapsed time from the previous timing. In other words, controller 500 calculates the average value of the air volume setting after the previous timing based on the air volume setting per the unit time after the previous timing. Controller 500 specifies "ID" by referring to the table in FIG. 8A based on the average value of the air volume setting and purification setting at timing when the supply of the next electrolyzed water is determined.

FIG. 8B is a table showing a supply amount of electrolyzed water associated with "ID". "ID=0" indicates stop of supply, and "ID=1" indicates temporary stop of supply. "ID=2" indicates a supply amount "A1", "ID=3" indicates a supply amount "A2", and "ID=4" indicates a supply amount "A3". Here, A1<A2<A3. Controller 500 determines a supply amount of the next electrolyzed water based on the specified "ID". The supply amount of the next electrolyzed water can be also said to be a supply amount of next hypochlorous acid water. The description returns to FIG. 5.

When determining the supply and determining the supply amount by the above-described processing, controller 500 causes third supply part 228 to supply next electrolyzed water in the determined supply amount of the electrolyzed water. The supply amount is controlled by, for example, a rotation speed and an operation time period of a pump motor in third supply part 228. The identified "ID" is used in the table of FIG. 7A for "(6-1) Supply timing control" in determining a next threshold value. When the electrolyzed water is supplied, controller 500 clears the average value of the air volume setting. When the electrolyzed water is supplied, controller 500 also clears the integrated value of the air volume setting.

(7) Second Water Feeding Processing

The second water feeding processing is processing for operating second pump 130 of second supply part 138 in order to supply the water in water storage tank 100 to mixing bath 300. Second supply part 138 is also referred to as a water supply part, and the water supply part supplies water from water storage tank 100 to mixing bath 300. In the second water feeding processing, the supply is started when any one of (7-1) a first condition, (7-2) a second condition, and (7-3) a third condition is satisfied, and the supply is stopped when (7-4) a stop condition is satisfied.

(7-1) First Condition

When water shortage float 360 of mixing bath 300 detects water shortage, controller 500 instructs second supply part 138 to supply water from water storage tank 100 to mixing bath 300. This is considered that when the amount of the water in mixing bath 300 decreases from a first threshold value corresponding to full water float 350 to a second threshold value corresponding to water shortage float 360, water feeding is performed. The second threshold value is set to be smaller than the first threshold value. The condition for supplying water may additionally include a failure of detection of full water by full water float 350 of mixing bath 300. Controller 500 stops third supply part 228 when instructing second supply part 138 to supply water. As a result, water is supplied from water storage tank 100 to mixing bath 300 before electrolyzed water is supplied to mixing bath 300 by third supply part 228.

(7-2) Second Condition

Controller 500 integrates humidification amounts based on an air volume and temperature and humidity every one minute, and instructs second supply part 138 to supply water from water storage tank 100 to mixing bath 300 when humidification is performed by a predetermined amount. Specifically, controller 500 receives air volume setting determined by air volume determination part 540 every unit time, e.g., every one minute. Controller 500 also receives humidity acquired by humidity sensor 522 and temperature acquired by temperature sensor 524 every unit time.

FIGS. 9A to 9C show data structures of still further tables stored in storage part 530. FIG. 9A shows a table of a humidification amount when the air volume setting is "F1". In the table of the humidification amount, the temperature and the humidity are respectively divided into a matrix within predetermined ranges, and humidification amounts are associated with the respective ranges. A threshold value for temperature is M1<M2, and a threshold value for humidity is G1<G2. FIG. 9B shows a table of a humidification amount when the air volume setting is "F2", and FIG. 9C shows a table of a humidification amount when the air volume setting is "F3". FIGS. 9B and 9C are shown similarly to FIG. 9A. The description returns to FIG. 5.

Controller 500 selects one of the humidification amount tables of FIGS. 9A to 9C based on the acquired air volume setting, and selects a humidification amount per unit time from received temperature and humidity with reference to the selected humidification amount table. Controller 500 integrates the humidification amount selected for each unit time, and instructs second supply part 138 to supply water when an integrated value of the humidification amounts exceeds a threshold value. The integrated value is cleared when full water float 350 of mixing bath 300 detects full water.

(7-3) Third Condition

After third supply part 228 supplies the electrolyzed water to mixing bath 300, controller 500 instructs second supply part 138 to feed water from water storage tank 100 to mixing bath 300 when full water float 350 of mixing bath 300 does not detect full water. A case where full water float 350 of mixing bath 300 does not detect full water corresponds to a case where the amount of water in mixing bath 300 is smaller than the first threshold value.

(7-4) Stop Condition

After the supply of water from water storage tank 100 to mixing bath 300 is started as a result of satisfaction of the first to third conditions, controller 500 causes second supply part 138 to stop supplying water when full water float 350 of mixing bath 300 detects full water. In other words, water is supplied from water storage tank 100 to mixing bath 300 until the amount of water in mixing bath 300 reaches the first threshold value.

The device, the system, or a subject of the method in the present disclosure is provided with a computer. Execution of a program by this computer realizes the functions of the device, the systems, or the subject of the method in the present disclosure. The computer includes, as a main hardware configuration, a processor that operates according to the program. A type of the processor is not limited as long as the processor can realize the functions by executing the program. The processor includes one or a plurality of electronic circuits including a semiconductor integrated circuit (IC) or a large scale integration (LSI). The plurality of electronic circuits may be integrated on one chip or may be provided on a plurality of chips. The plurality of chips may be aggregated into one device or may be provided in a plurality of devices. The program is recorded in a computer-readable non-transitory recording medium such as a read only memory (ROM), an optical disk, or a hard disk drive. The program may be stored in advance in a recording medium, or may be supplied to the recording medium via a wide area communication network including the Internet.

Operation of space purification device 1000 having the above configuration will be described. FIG. 10 is a flowchart showing a control procedure by space purification device 1000.

For example, after the power of the space purification device 1000 is turned on, water is supplied to water storage tank 100 (S10).

Next, water is supplied from water storage tank 100 to mixing bath 300 (S12).

Next, water is supplied from water storage tank 100 to electrolytic bath 200 by an amount smaller than a full capacity (S14).

Next, electrolysis accelerator 410 is supplied to electrolytic bath 200 (S16).

Next, water is supplied from water storage tank 100 to electrolytic bath 200 to the full capacity (S18).

Next, electrode part 210 executes electrolysis for ten minutes (S20).

Next, electrolyzed water having the second concentration is supplied from electrolytic bath 200 to mixing bath 300 (S22). Thereafter, purification part 310 releases the electrolyzed water.

Next, water is supplied from water storage tank 100 to electrolytic bath 200 to the full capacity (S24).

Next, electrode part 210 executes electrolysis for 40 minutes (S26).

Next, controller 500 determines a supply amount of the electrolyzed water based on purification setting and air volume setting (S28).

Next, the determined supply amount of electrolyzed water having the first concentration is supplied from electrolytic bath 200 to mixing bath 300 (S30).

Figure 11:
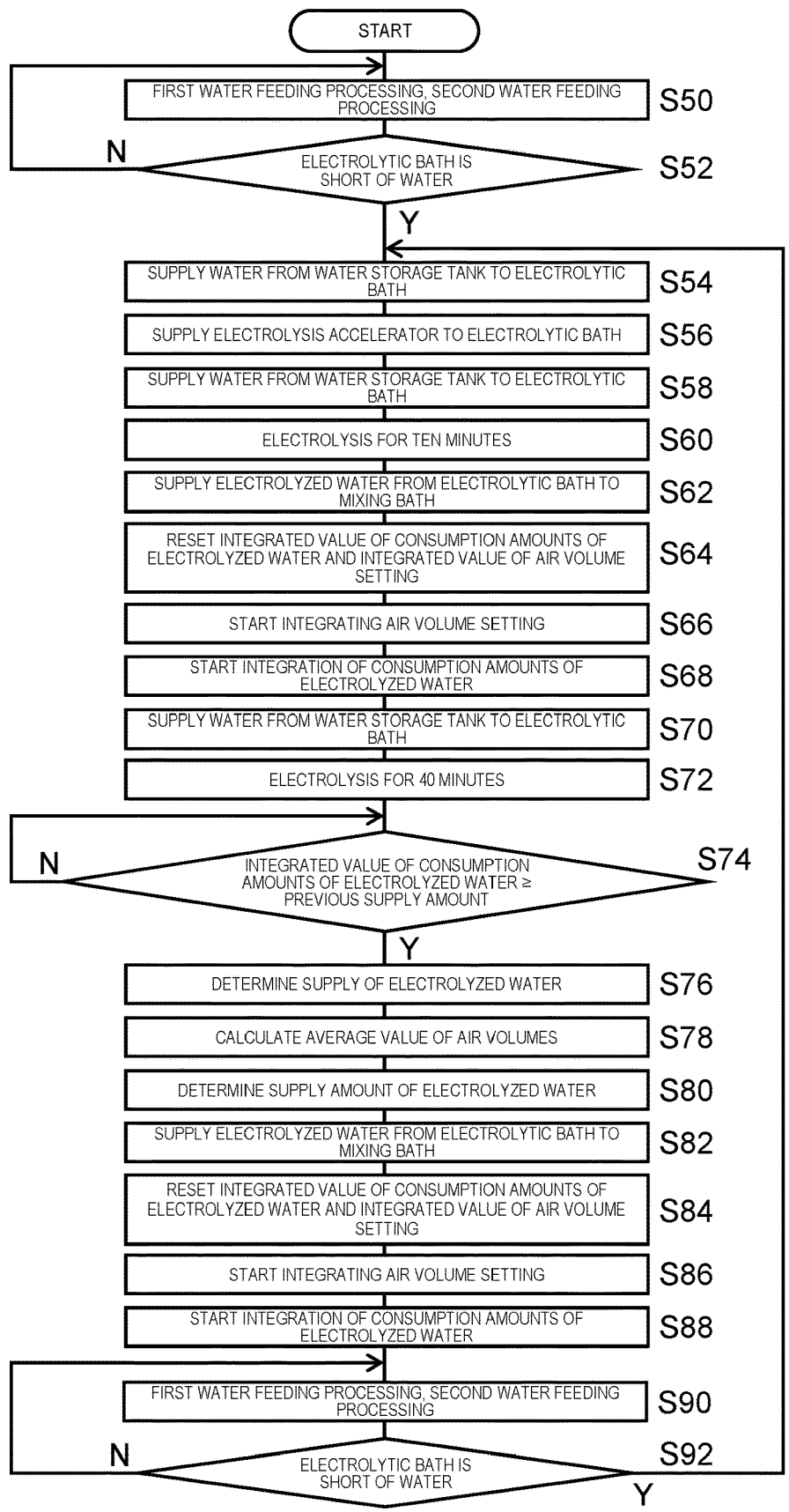
FIG. 11 is a flowchart showing another control procedure by the space purification device according to the exemplary embodiment of the present disclosure.

FIG. 11 is a flowchart showing another control procedure by space purification device 1000. This shows processing following FIG. 10.

At least one of the first water feeding processing and the second water feeding processing is executed (S50).

Next, water shortage float 260 determines whether or not electrolytic bath 200 is short of water (S52). When it is determined that electrolytic bath 200 is not short of water (N in S52), the processing returns to Step S50. When it is determined that electrolytic bath 200 is short of water (Y in S52), water is supplied from water storage tank 100 to electrolytic bath 200 by an amount smaller than the full capacity (S54).

Next, electrolysis accelerator 410 is supplied to electrolytic bath 200 (S56).

Next, water is supplied from water storage tank 100 to electrolytic bath 200 to the full capacity (S58).

Next, electrode part 210 executes electrolysis for ten minutes (S60).

Next, electrolyzed water is supplied from electrolytic bath 200 to mixing bath 300 (S62).

Next, controller 500 resets an integrated value of consumption amounts of electrolyzed water and an integrated value of air volume setting (Step S64).

Next, controller 500 starts integrating the air volume setting (S66). Furthermore, controller 500 starts integration of the consumption amounts of the electrolyzed water derived based on the air volume setting and the purification setting (S68).

Next, water is supplied from water storage tank 100 to electrolytic bath 200 to the full capacity (S70).

Next, electrode part 210 executes electrolysis for 40 minutes (S72).

Next, controller 500 determines whether or not the integrated value of the consumption amounts of the electrolyzed water is equal to or more than a previous supply amount (S74). When it is determined that the integrated value of the consumption amount is not equal to or more than the previous supply amount (N in S74), the processing returns to step 74. When it is determined that the integrated value of the consumption amounts is equal to or more than the previous supply amount (Y in S74), controller 500 determines supply of the electrolyzed water (S76).

Next, controller 500 calculates an average value of air volumes (S78), and determines a supply amount of the electrolyzed water based on the average value of air volumes and the purification setting (S80).

Next, the determined supply amount of electrolyzed water is supplied from electrolytic bath 200 to mixing bath 300 (S82).

Next, controller 500 resets the integrated value of the consumption amounts of the electrolyzed water and the integrated value of air volume setting (Step S84).

Next, controller 500 starts integrating the air volume setting (S86). Furthermore, controller 500 starts integration of the consumption amounts of the electrolyzed water derived based on the air volume setting and the purification setting (S88).

Next, at least one of the first water feeding processing and the second water feeding processing is executed (S90).

Next, water shortage float 260 determines whether or not electrolytic bath 200 is short of water (S92). When it is determined that electrolytic bath 200 is not short of water (N in S92), the processing returns to Step S90. When it is determined that electrolytic bath 200 is short of water (Y in S92), the processing returns to Step S54.

According to the present exemplary embodiment, since a supply amount of hypochlorous acid water is determined based on purification setting and air volume setting, an appropriate amount of hypochlorous acid water can be supplied. In addition, since a supply amount of the next hypochlorous acid water is determined based on the purification setting, air volume setting after previous timing at which the hypochlorous acid water has been previously supplied, and an elapsed time from the previous timing, an appropriate amount of hypochlorous acid water can be supplied. In addition, since an appropriate amount of hypochlorous acid water can be supplied, active oxygen species can be released in an amount suitable for a use environment. In addition, since an average value of air volume setting after the previous timing is calculated and a supply amount of next hypochlorous acid water is determined based on the purification setting and an average value of the air volume setting, accuracy of a supply amount of hypochlorous acid water can be improved. In addition, since the accuracy of the supply amount of hypochlorous acid water can be improved, accuracy of a release amount of active oxygen species can be improved, the release amount being suitable for a use environment.

Furthermore, when an integrated value of consumption amounts of hypochlorous acid water per unit time becomes equal to or more than a supply amount of hypochlorous acid water at the previous timing, supply of next hypochlorous acid water is determined, so that the hypochlorous acid water can be supplied at appropriate timing. In addition, since hypochlorous acid water can be supplied at appropriate timing, active oxygen species can be released in an amount suitable for a use environment. Furthermore, since air volume setting is determined based on environmental variables, an air volume according to the environment can be set. In addition, since at least one of a type of gas and a concentration of the gas, and at least one of humidity and temperature are used as environmental variables, surrounding situations can be reflected in the environmental variables.

When an amount of water in mixing bath 300 decreases from the first threshold value to the second threshold value, water is supplied until the amount of water in mixing bath 300 reaches the first threshold value before hypochlorous acid water is supplied to mixing bath 300, so that water can be supplied at appropriate timing. In addition, when the amount of water in mixing bath 300 decreases from the first threshold value to the second threshold value, water is supplied until the amount of water in mixing bath 300 reaches the first threshold value before hypochlorous acid water is supplied to mixing bath 300, so that a situation in which a concentration of hypochlorous acid water in mixing bath 300 becomes too high can be avoided. In addition, since the situation in which the concentration of hypochlorous acid water in mixing bath 300 becomes too high is avoided, safety can be improved. In addition, after the hypochlorous acid water is supplied to mixing bath 300, water is supplied when the amount of water in mixing bath 300 is smaller than the first threshold value, so that the situation in which a concentration of hypochlorous acid water in mixing bath 300 becomes too high can be avoided.

Since water storage tank 100, electrolytic bath 200, and mixing bath 300 are provided separately, it is possible to suppress occurrence of gas-liquid contact with water in electrolytic bath 200 used by electrode part 210. In addition, since the occurrence of gas-liquid contact with water in electrolytic bath 200 is suppressed, the water in electrolytic bath 200 can be made less likely to be contaminated. Furthermore, since the water in electrolytic bath 200 is less likely to be contaminated, deterioration of electrodes can be suppressed. Since the electrolyzed water having the second concentration is supplied to mixing bath 300 and released, a period until the electrolyzed water is released can be shortened. Since following electrolyzed water having the second concentration, electrolyzed water having the first concentration is generated, electrolyzed water having a desired concentration can be released. In addition, since electrolysis accelerator 410 is input toward supply region 240 and water is supplied toward supply region 240, dissolution of electrolysis accelerator 410 can be promoted by a pressure of the water. Since the electrolyzed water having the first concentration is generated by the regular processing after the water is supplied to electrolytic bath 200, electrolysis accelerator 410 can be easily dissolved.

Since water is supplied to electrolytic bath 200 by first supply part 128 when water shortage is detected, a need of water supply can be eliminated until water shortage is detected. Since the need of the water supply is eliminated until the water shortage is detected, a concentration of the electrolyzed water in electrolytic bath 200 can be maintained. Since elimination of the need of the water supply until the water shortage is detected enables impurities remaining in electrolytic bath 200 to flow out. Since a part of the initial processing is executed as the reprocessing, the operation can be simplified.

An outline of one aspect of the present disclosure is as follows. Space purification device (1000) according to an aspect of the present disclosure includes: electrolytic bath (200) that stores water supplied from outside; electrode part (210) that is provided in electrolytic bath (200) and generates hypochlorous acid water having a predetermined concentration from the water stored in electrolytic bath (200); mixing bath (300) that mixes the hypochlorous acid water and water to generate mixed water; hypochlorous acid water supply part (228) that supplies the hypochlorous acid water from electrolytic bath (200) to mixing bath (300); water supply part (138) that supplies the water to mixing bath (300); air blower (518) that takes in air from an air suction port based on preset air volume setting; purification part (310) that brings the mixed water stored in mixing bath (300) into contact with the air taken in from the air suction port; and controller (500) that controls electrode part (210), hypochlorous acid water supply part (228), water supply part (138), and air blower (518). Controller (500) determines a supply amount of the hypochlorous acid water to be supplied by hypochlorous acid water supply part (228) based on purification setting indicating a purification capability required of purification part (310) and the air volume setting.

Space purification device (1000) according to another aspect of the present disclosure includes: electrolytic bath (200) that stores water supplied from outside; electrode part (210) that is provided in electrolytic bath (200) and generates hypochlorous acid water having a predetermined concentration from the water stored in electrolytic bath (200); mixing bath (300) that mixes the hypochlorous acid water and water to generate mixed water; hypochlorous acid water supply part (228) that supplies the hypochlorous acid water from electrolytic bath (200) to mixing bath (300); water supply part (138) that supplies the water to mixing bath (300); air blower (518) that takes in air from an air suction port based on preset air volume setting; purification part (310) that brings the mixed water stored in mixing bath (300) into contact with the air taken in from the air suction port; and controller (500) that controls electrode part (210), hypochlorous acid water supply part (228), water supply part (138), and air blower (518). Controller (500) determines a supply amount of next hypochlorous acid water to be supplied by hypochlorous acid water supply part (228) based on purification setting indicating a purification capability required of purification part (310), the air volume setting after previous timing at which the hypochlorous acid water has been previously supplied, and an elapsed time from the previous timing.

Controller (500) may calculate an average value of air volume setting after the previous timing based on the air volume setting per the unit time after the previous timing, and determine the supply amount of the next hypochlorous acid water to be supplied by hypochlorous acid water supply part (228) based on the purification setting and the average value of the air volume setting.

Controller (500) may calculate a consumption amount of the hypochlorous acid water per the unit time based on the air volume setting per the unit time after the previous timing and the purification setting, integrate the consumption amount of the hypochlorous acid water per the unit time, and cause hypochlorous acid water supply part (228) to supply the next hypochlorous acid water when the integrated consumption amount becomes equal to or more than the supply amount of the hypochlorous acid water at the previous timing.

Controller (500) may include air volume determination part (540) that determines the air volume setting to be set to air blower (518). Air volume determination part (540) may determine the air volume setting based on environmental variables.

Space purification device (1000) may further include at least one of gas sensor (520) that detects gas, humidity sensor (522) that detects humidity, and temperature sensor (524) that detects temperature. The environmental variables may be at least one of a type of a gas and a concentration of the gas acquired by gas sensor (520), and at least one of humidity acquired by humidity sensor (522) and temperature acquired by temperature sensor (524).

When an amount of water in mixing bath (300) decreases from a first threshold value to a second threshold value, controller (500) may cause water supply part (138) to supply water until the amount of water in mixing bath (300) reaches the first threshold value before the hypochlorous acid water is supplied to mixing bath (300) by hypochlorous acid water supply part (228), and the second threshold value may be smaller than the first threshold value.

After the hypochlorous acid water is supplied to mixing bath (300) by hypochlorous acid water supply part (228), when the amount of water in mixing bath (300) is smaller than a first threshold value, controller (500) may cause water supply part (138) to supply water until the amount of water in mixing bath (300) reaches the first threshold value.

Space purification device (1000) according to a further aspect of the present disclosure includes: electrolytic bath (200) that stores water supplied from outside; electrode part (210) that is provided in electrolytic bath (200) and generates hypochlorous acid water having a predetermined concentration from the water stored in electrolytic bath (200); mixing bath (300) that mixes the hypochlorous acid water and water to generate mixed water; hypochlorous acid water supply part (228) that supplies the hypochlorous acid water from electrolytic bath (200) to mixing bath (300); water supply part (138) that supplies water to mixing bath (300); air blower (518) that takes in air from an air suction port based on preset air volume setting; purification part (310) that brings the mixed water stored in mixing bath (300) into contact with the air taken in from the air suction port; and controller (500) that controls electrode part (210), hypochlorous acid water supply part (228), water supply part (138), and air blower (518). Controller (500) include air volume determination part (540) that determines the air volume setting to be set to air blower (518). Air volume determination part (540) determines the air volume setting based on environmental variables.

Space purification device (1000) may further include at least one of gas sensor (520) that detects gas, humidity sensor (522) that detects humidity, and temperature sensor (524) that detects temperature. The environmental variables may be at least one of a type of a gas and a concentration of the gas acquired by gas sensor (520), and at least one of humidity acquired by humidity sensor (522) and temperature acquired by temperature sensor (524).

The present disclosure has been described in the foregoing based on the exemplary embodiment. It will be understood by those skilled in the art that the exemplary embodiment is merely an example, that various modifications in combinations of components or processing processes of the exemplary embodiment are possible, and that such modifications fall within the scope of the present disclosure.

In the present exemplary embodiment, gas sensor 520, humidity sensor 522, and temperature sensor 524 are provided. However, the present disclosure is not limited thereto, and for example, one or more of these may be provided. The present modification can improve a degree of freedom in the configuration.

In addition, controller 500 may cause the hypochlorous acid water supply part (third supply part 228) to supply hypochlorous acid water when a drainage detection part detects that water or hypochlorous acid water in mixing bath 300 has been drained. In the present exemplary embodiment, the drainage detection part is drainage float 370, and drainage float 370 can detect whether or not the water or the hypochlorous acid water in mixing bath 300 is present up to a position of drainage float 370. A state in which the water or the hypochlorous acid water does not present up to the position of drainage float 370 is a state in which the water or the hypochlorous acid water in mixing bath 300 has been drained, and a state in which the water or the hypochlorous acid water is present up to the position of drainage float 370 is a state in which the water or the hypochlorous acid water in mixing bath 300 has not been drained. In other words, it is possible to detect, by drainage float 370, whether or not the water or the hypochlorous acid water in mixing bath 300 has been drained.

As an example, it is assumed that regarding an operation time of space purification device 1000, every time a predetermined operation time elapses, controller 500 notifies that drainage of water or hypochlorous acid water in mixing bath 300 is necessary. As a notification method by controller 500, for example, space purification device 1000 includes a notification part, and when drainage of water or hypochlorous acid water in mixing bath 300 is necessary, controller 500 notifies that drainage is necessary via the notification part. Upon receiving the notification from the notification part, a user drains the water or the hypochlorous acid water in mixing bath 300. Thereafter, the drainage detection part detects that the water or the hypochlorous acid water in mixing bath 300 has been drained.

When the drainage detection part detects that the drainage has been executed, controller 500 may set a supply amount at a time of supplying the hypochlorous acid water to the hypochlorous acid water supply part to be a settable maximum supply amount. In the description of the present exemplary embodiment, controller 500 causes the hypochlorous acid water supply part to supply the hypochlorous acid water of the settable maximum supply amount "A3". Since there is no hypochlorous acid water in mixing bath 300 after drainage by the user, it is possible to supply sufficient hypochlorous acid water to mixing bath 300. As a result, air brought into contact with the hypochlorous acid water (electrolyzed water) in mixing bath 300 can be released to the outside of space purification device 1000 at an early stage. Furthermore, a sufficient amount of hypochlorous acid (active oxygen species) can be supplied to a space where space purification device 1000 is installed.

In addition, the drainage detection part may not be a drainage float. For example, an input part may be provided to which a user inputs completion of drainage after execution of drainage work of mixing bath 300, and the drainage detection part may detect that water or hypochlorous acid water in mixing bath 300 has been drained by detecting that completion of the drainage is input to the input part by the user.

REFERENCE MARKS IN THE DRAWINGS

- 100 water storage tank
- 110 water supply tank
- 112 lid
- 120 first pump
- 122 first water supply pipe
- 124 supply port
- 128 first supply part
- 130 second pump
- 132 second water supply pipe
- 138 second supply part (water supply part)
- 160 water shortage float
- 200 electrolytic bath
- 210 electrode part
- 220 third pump
- 222 third water supply pipe
- 224 fixed capacity container
- 226 third water supply pipe
- 228 third supply part (hypochlorous acid water supply part)
- 240 supply region
- 250 full water float
- 260 water shortage float
- 300 mixing bath
- 310 purification part
- 350 full water float
- 360 water shortage float
- 370 drainage float
- 400 electrolysis accelerator input part
- 404 input port
- 410 electrolysis accelerator
- 460 electrolyzed water generation part
- 500 controller
- 516 operation part
- 518 air blower
- 520 gas sensor
- 522 humidity sensor
- 524 temperature sensor
- 530 storage part
- 540 air volume determination part
- 1000 space purification device

What is claimed is:

1. A space purification device comprising:
   an electrolytic bath that stores water supplied from outside;
   an electrode part that is provided in the electrolytic bath and generates hypochlorous acid water having a predetermined concentration from the water stored in the electrolytic bath;
   a mixing bath that mixes the hypochlorous acid water and water to generate mixed water;
   a hypochlorous acid water supply part that supplies the hypochlorous acid water from the electrolytic bath to the mixing bath;
   a water supply part that supplies the water to the mixing bath;
   an air blower that takes in air from an air suction port based on preset air volume setting;
   a purification part that brings the mixed water stored in the mixing bath into contact with the air taken in from the air suction port; and
   a controller that controls the electrode part, the hypochlorous acid water supply part, the water supply part, and the air blower,
   wherein the controller determines a supply amount of the hypochlorous acid water to be supplied by the hypochlorous acid water supply part based on purification setting indicating a purification capability required of the purification part and the air volume setting.

2. The space purification device according to claim 1, wherein
   the controller includes an air volume determination part that determines the air volume setting to be set to the air blower, and
   the air volume determination part determines the air volume setting based on environmental variables.

3. The space purification device according to claim 1, wherein
   when an amount of water in the mixing bath decreases from a first threshold value to a second threshold value, the controller causes the water supply part to supply the water until the amount of water in the mixing bath reaches the first threshold value before the hypochlorous acid water is supplied to the mixing bath by the hypochlorous acid water supply part, and
   the second threshold value is smaller than the first threshold value.

4. The space purification device according to claim 1, wherein after the hypochlorous acid water is supplied to the mixing bath by the hypochlorous acid water supply part, when an amount of water in the mixing bath is smaller than a first threshold value, the controller causes the water supply part to supply the water until the amount of water in the mixing bath reaches the first threshold value.

5. The space purification device according to claim 1, further comprising a drainage detection part that detects that the water or the hypochlorous acid water in the mixing bath has been drained, wherein
the controller causes the hypochlorous acid water supply part to supply the hypochlorous acid water when the drainage detection part detects that the water or the hypochlorous acid water has been drained.

6. A space purification device comprising:
an electrolytic bath that stores water supplied from outside;
an electrode part that is provided in the electrolytic bath and generates hypochlorous acid water having a predetermined concentration from the water stored in the electrolytic bath;
a mixing bath that mixes the hypochlorous acid water and water to generate mixed water;
a hypochlorous acid water supply part that supplies the hypochlorous acid water from the electrolytic bath to the mixing bath;
a water supply part that supplies the water to the mixing bath;
an air blower that takes in air from an air suction port based on preset air volume setting;
a purification part that brings the mixed water stored in the mixing bath into contact with the air taken in from the air suction port; and
a controller that controls the electrode part, the hypochlorous acid water supply part, the water supply part, and the air blower,
wherein the controller determines a supply amount of next hypochlorous acid water to be supplied by the hypochlorous acid water supply part based on purification setting indicating a purification capability required of the purification part, the air volume setting after previous timing at which the hypochlorous acid water has been previously supplied, and an elapsed time from the previous timing.

7. The space purification device according to claim 6, wherein
the controller
calculates a consumption amount of the hypochlorous acid water per unit time based on the air volume setting per the unit time after the previous timing and the purification setting,
integrates the consumption amount of the hypochlorous acid water per the unit time, and
causes the hypochlorous acid water supply part to supply the next hypochlorous acid water when an integrated consumption amount becomes equal to or more than the supply amount of the hypochlorous acid water at the previous timing.

8. The space purification device according to claim 6, wherein
the controller
calculates an average value of air volume setting after the previous timing based on the air volume setting per the unit time after the previous timing, and
determines the supply amount of the next hypochlorous acid water to be supplied by the hypochlorous acid water supply part based on the purification setting and the average value of the air volume setting.

9. The space purification device according to claim 8, wherein
the controller
calculates a consumption amount of the hypochlorous acid water per the unit time based on the air volume setting per the unit time after the previous timing and the purification setting,
integrates the consumption amount of the hypochlorous acid water per the unit time, and
causes the hypochlorous acid water supply part to supply the next hypochlorous acid water when an integrated consumption amount becomes equal to or more than the supply amount of the hypochlorous acid water at the previous timing.

10. The space purification device according to claim 6, wherein
the controller includes an air volume determination part that determines the air volume setting to be set to the air blower, and
the air volume determination part determines the air volume setting based on environmental variables.

11. The space purification device according to claim 10, further comprising at least one of a gas sensor that detects gas, a humidity sensor that detects humidity, and a temperature sensor that detects temperature, wherein
the environmental variables are at least one of a type of a gas and a concentration of the gas acquired by the gas sensor, and at least one of humidity acquired by the humidity sensor and temperature acquired by the temperature sensor.

12. The space purification device according to claim 6, wherein
when an amount of water in the mixing bath decreases from a first threshold value to a second threshold value, the controller causes the water supply part to supply the water until the amount of water in the mixing bath reaches the first threshold value before the hypochlorous acid water is supplied to the mixing bath by the hypochlorous acid water supply part, and
the second threshold value is smaller than the first threshold value.

13. The space purification device according to claim 12, wherein after the hypochlorous acid water is supplied to the mixing bath by the hypochlorous acid water supply part, when the amount of water in the mixing bath is smaller than the first threshold value, the controller causes the water supply part to supply the water until the amount of water in the mixing bath reaches the first threshold value.

14. The space purification device according to claim 6, wherein after the hypochlorous acid water is supplied to the mixing bath by the hypochlorous acid water supply part, when an amount of water in the mixing bath is smaller than a first threshold value, the controller causes the water supply part to supply the water until the amount of water in the mixing bath reaches the first threshold value.

15. The space purification device according to claim 6, further comprising a drainage detection part that detects that the water or the hypochlorous acid water in the mixing bath has been drained, wherein
the controller causes the hypochlorous acid water supply part to supply the hypochlorous acid water when the drainage detection part detects that the water or the hypochlorous acid water has been drained.

16. The space purification device according to claim 15, wherein when the drainage detection part detects that the water or the hypochlorous acid water has been drained, the controller sets a supply amount at a time of supplying the hypochlorous acid water by the hypochlorous acid water supply part to be a settable maximum supply amount.

17. A space purification device comprising:
an electrolytic bath that stores water supplied from outside;
an electrode part that is provided in the electrolytic bath and generates hypochlorous acid water having a predetermined concentration from the water stored in the electrolytic bath;
a mixing bath that mixes the hypochlorous acid water and water to generate mixed water;
a hypochlorous acid water supply part that supplies the hypochlorous acid water from the electrolytic bath to the mixing bath;
a water supply part that supplies the water to the mixing bath;
an air blower that takes in air from an air suction port based on preset air volume setting;
a purification part that brings the mixed water stored in the mixing bath into contact with the air taken in from the air suction port; and
a controller that controls the electrode part, the hypochlorous acid water supply part, the water supply part, and the air blower,
wherein the controller includes an air volume determination part that determines the air volume setting to be set to the air blower, and the air volume determination part determines the air volume setting based on environmental variables.

18. The space purification device according to claim 17, further comprising at least one of a gas sensor that detects gas, a humidity sensor that detects humidity, and a temperature sensor that detects temperature, wherein
the environmental variables are at least one of a type of a gas and a concentration of the gas acquired by the gas sensor, and at least one of humidity acquired by the humidity sensor and temperature acquired by the temperature sensor.

19. The space purification device according to claim 17, further comprising a drainage detection part that detects that the water or the hypochlorous acid water in the mixing bath has been drained, wherein
the controller causes the hypochlorous acid water supply part to supply the hypochlorous acid water when the drainage detection part detects that the water or the hypochlorous acid water has been drained.

* * * * *